Feb. 6, 1934.  E. H. THOMPSON  1,945,835
FARE COLLECTION SYSTEM
Filed July 20, 1931   3 Sheets-Sheet 1
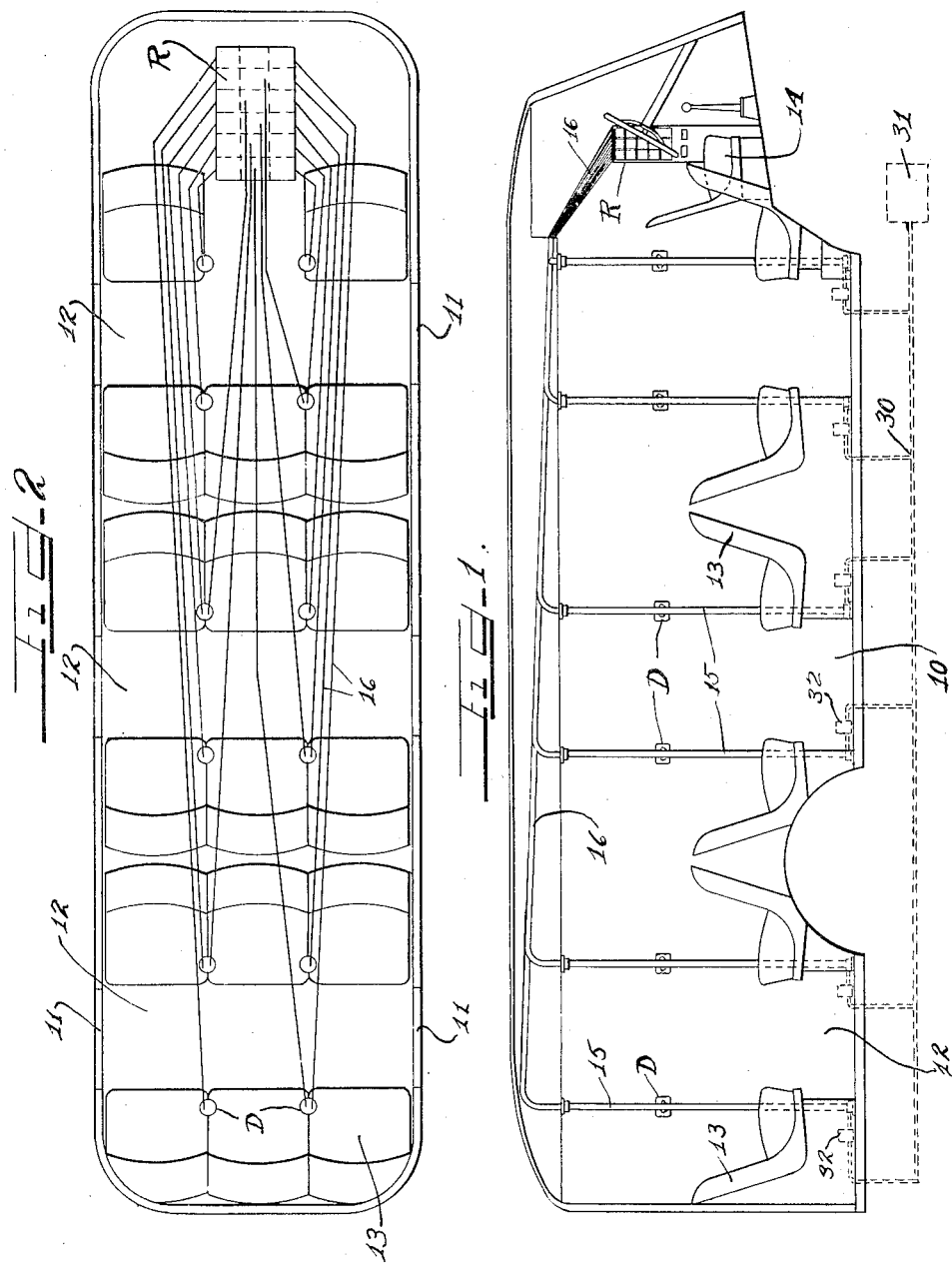
Inventor
Ernest H. Thompson.

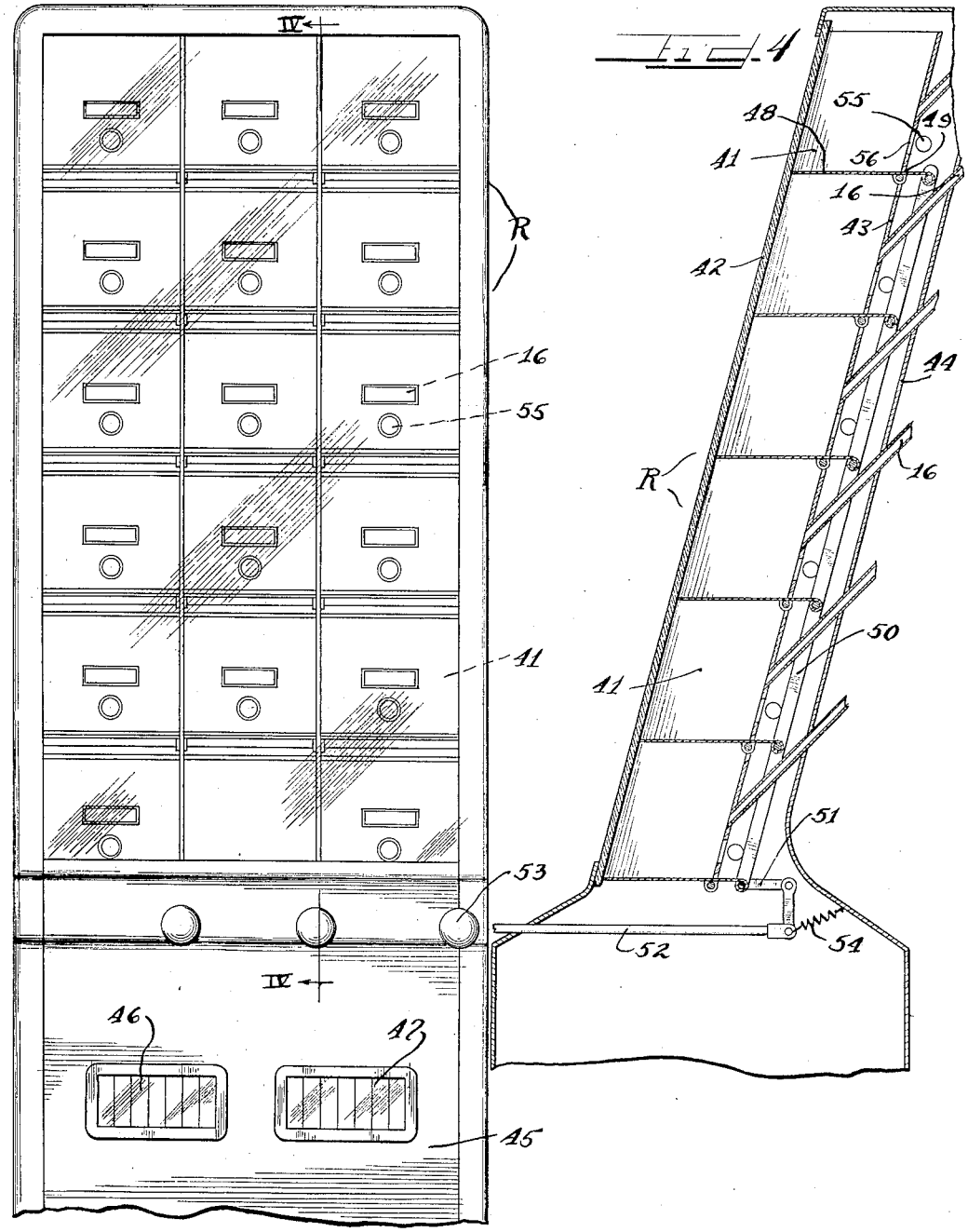

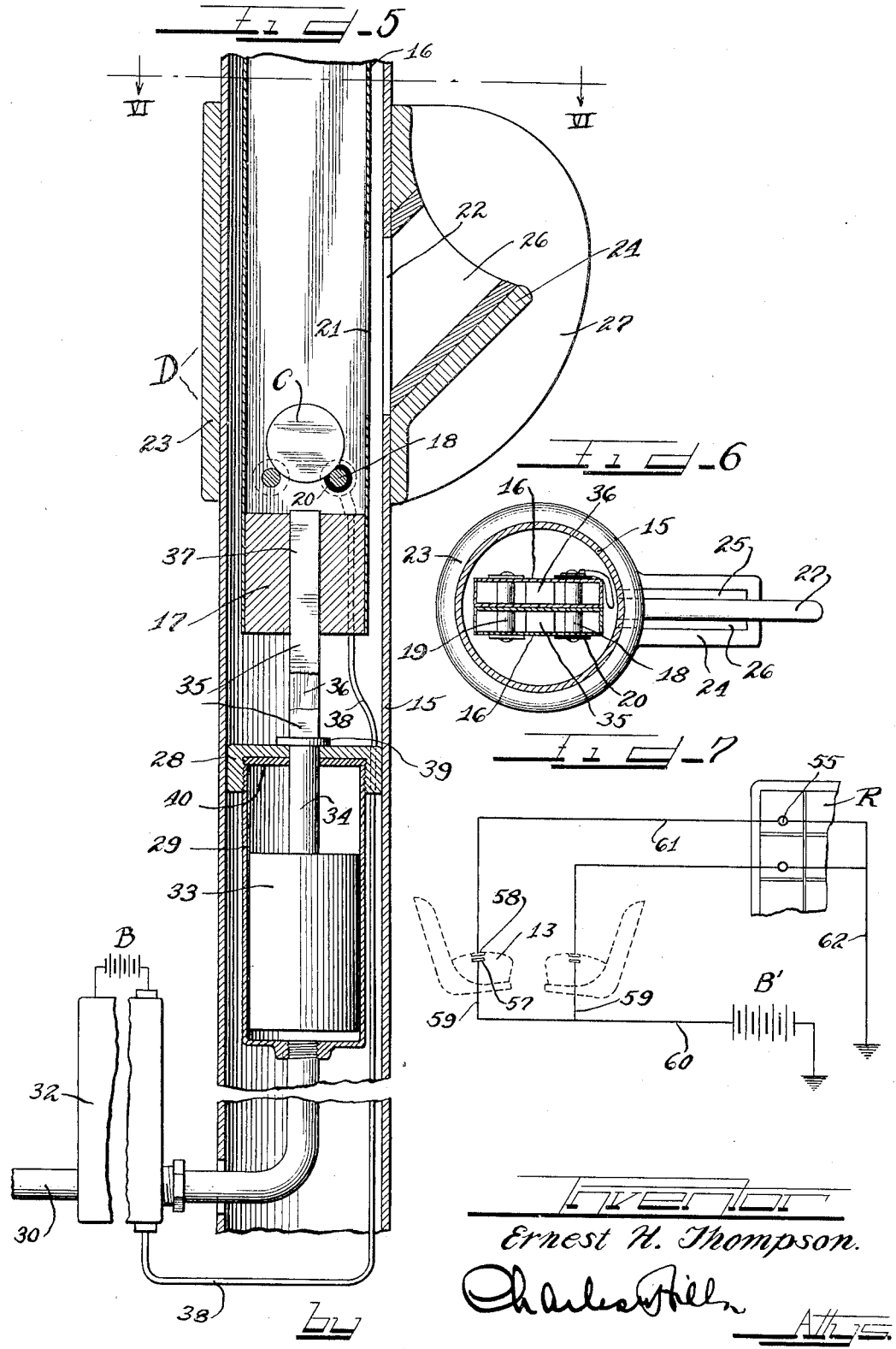

Patented Feb. 6, 1934

1,945,835

UNITED STATES PATENT OFFICE 1,945,835

FARE COLLECTION SYSTEM

Ernest H. Thompson, Hubbard Woods, Ill., assignor to Johnson Fare Box Co., Chicago, Ill., a corporation of New York Application July 20, 1931. Serial No. 551,840

9 Claims. (Cl. 232—9)

My invention relates to a fare collection system and equipment particularly desirable and efficient for the automatic collection and registration of fares in vehicles such as taxi coaches.

In general the object of the invention is to provide a simple, modern and efficient system of fare collection so that fares may be deposited at various points in a vehicle without inconvenience to the depositors, together with improved means for delivering the deposited coins or tokens to receiving apparatus under supervision of the operator or driver of the vehicle so that he may readily check up fares received with the passengers who deposited them.

In my improved system, fare depositories are located at the various entrances of a vehicle or at the various seating spaces therein and the receiving, checking and supervising apparatus is at the operator's seat, and an important object of the invention is to provide power means for impacting directly against the deposited coins to project or propel them through fixed paths from the points of deposit to the receiving end collecting apparatus at the operator's seat.

A further object is to have the deposited coins automatically control the operation of the projecting means, which means may be electrically, magnetically, pneumatically, mechanically, or otherwise operated.

A still further object of the invention is to provide compartments in the receiving apparatus at the operator's seat corresponding with the points of deposit in the vehicle so that the operator may know at what point of the vehicle a deposit was made so that he may check the fares received with the passengers.

My invention also possesses other features of construction arrangement and operation, and all the features are incorporated in the structure shown on the drawings, in which drawings:

Figure 1 is a more or less diagrammatic side elevation of the body of a vehicle;

Figure 2 is a plan view of the vehicle body shown in Figure 1;

Figure 3 is a front elevation of the receiving apparatus at the operator's station;

Figure 4 is a section on plane IV—IV Figure 3;

Figure 5 is an enlarged diametral sectional view of one of the stanchions in the vehicle which supports the coin inserts or depositories and the coin impelling mechanisms;

Figure 6 is a section on plane VI—VI Figure 5; and

Figure 7 is a diagrammatic view showing the circuit arrangement of the means for indicating which seats in the vehicle are occupied.

On Figures 1 and 2, 10 represents the body of a vehicle such as a taxi coach, the vehicle having a number of entrances and exits opening 11 at its sides which communicate with cross aisles 12 defined by transverse seat structures, each structure being shown as comprising three seats 13. The vehicle shown has seventeen passenger seats and at the front of the vehicle is the operator's or driver's seat 14.

I have shown a number of tubular stanchions 15 extending upwardly from the floor of the vehicle, there being a stanchion between each two adjacent seats 13. Extending upwardly from the stanchions and to the front of the vehicle are the coin guiding tubes or chutes 16 which connect with the receiving apparatus R at the front of the vehicle. There is a coin chute for each seat 13 and where there are three seats in a row one of the stanchions will have two chutes leading therefrom and the others only one.

Each stanchion carries a coin depository fitting D and Figures 5 and 6 show such fitting applied to a stanchion from which two coin chutes extend. The two chutes extend down side by side into the stanchion and are secured therein by any suitable means, the lower end of each tube being closed by a plug 17. A short distance above these plugs two contact bars 18 and 19 extend transversely through the tubes, the bar 18 being insulated from the tubes by insulation 20 but the bar 19 being uninsulated from the tubes so as to be in electrical engagement therewith. Just above the contact bars each tube has a vertical entrance slot 21 in its front side which slots are in register with slot 22 in the stanchion.

The depository fitting for the stanchions comprises a sleeve 23 receiving and secured to the stanchion and at its front side having the lug 24 provided with two downwardly inclined coin receiving passageways 25 and 26 which register with the slots 22 and 21 in the stanchion and chute respectively, there being a partition wall 27 between the passageways 25 and 26 for guidance of the passenger in depositing his fare. The passenger taking the seat at one side of the partition 27 will deposit his fare in the fare receiving passageway at the corresponding side of the partition 27 while the passenger taking the adjacent seat will deposit his fare in the passageway at the opposite side of the partition. Where there is only a single coin chute extending from a stanchion, the depository fitting D will have only one fare depositing passageway, or if a double passageway fitting is used, one of the passageways could be closed and the passageway left open at that side of the partition 27 where the passenger will be guided in depositing his fare. For example, in the last row of seats the passenger taking the seat at the right will deposit his fare in the passageway at the corresponding side of the partition 27 of the deposit fitting on the stanchion between the right end seat and the middle seat, and the passenger for the middle seat will deposit his fare in the passageway on the corresponding side of the partition wall. On the stanchion between the middle seat and the left seat the passageway at the left of the corresponding partition wall will be open to receive the passenger's fare, so that for each seat a coin or fare depositing passageway is presented to the passenger.

When a coin is deposited in one of the depository passageways it rolls through the corresponding registering slots 22 and 21 of the stanchion and corresponding chute and comes to rest on the contact bars 18 and 19, and closes a circuit which initiates the operation of the coin impact or impelling mechanism.

I have shown pneumatically operated impact or impelling means. In each stanchion below the ends of the coin chutes there is secured a cross wall 28 forming the head for a cylinder 29 which is connected at its lower end by piping 30 with a source of compressed air 31 (Figure 1) which source may also furnish compressed air for the operation of the vehicle brakes, the closing and opening of doors and for other services. The air service pipe 30 is connected with each cylinder through a suitable valve 32 for controlling the air flow into the cylinder. Although I have not shown the details of the valve construction, the valve may be so constructed that it will be normally yieldingly held closed and with the provision of electrical means for opening the valve under proper current flow.

Within the cylinder 29 is the plunger 33 from which the rod 34 extends upwardly through the head 28 and terminates in two parallel vertical arms 35 and 36 which extend through passageways 37 in the plugs 17 at the lower end of the coin chutes 16. When the plunger is down the upper ends of the arms are a distance below a coin C which has been deposited and which is resting on the contact bars 18 and 19. The bar 19 is in electrical contact with the metal framework of the stanchion structure and the contact bar 18 is connected by conductor 38 with one terminal of the electrical controlling mechanism (not shown) of the valve 32, the other terminal of this mechanism connecting with a battery B whose other terminal is grounded to the valve framework. When a coin or coins are deposited in the depository structure D their engagement with the contact bars 18 and 19 will close the circuit through the valve operating mechanism and the valve will be opened for a charge of compressed fluid into the cylinder 29 below the plunger 33, with the result that the plunger is projected suddenly upwardly and the deposited coins receive a violent impact by the arms 35 and 36 whereby sufficient momentum is imparted to the coins to cause them to be projected rapidly through the respective coin chutes to the receiver R. As soon as the coins have been removed from the contact bars, the circuit will be opened and the plunger will recede, the recessional movement being limited by an abutment collar 39 on the stem 34. To cushion the blow of the plunger against the head 28 a washer 40 of rubber or other suitable cushioning material may be provided at the inner side of the head.

The coin receiver R at the operator's seat is subdivided into a plurality of compartments 41, the arrangement of which may be in accord with the arrangement of the seats in the vehicle, and for each seat a coin chute extends from the respective depository D to the respective compartment. The front wall of the compartment is defined by the front wall 42 which may be of glass and an intermediate wall 43, the coin chutes 16 extending through the rear wall 44 of the receiver and through the intermediate wall 43 to the respective compartments.

The base 45 of the receiver forms a coin collection box or receptacle for receiving the coins from the coin compartments, and in this receptacle means may be provided for counting the coins as for example counter 46. Where both coins and tokens are acceptable as fares the receptacle 45 may contain means for separating the coins from the tokens and separately counting the tokens as by means of a counter 47.

The compartments 41 are provided with tiltable bottom walls 48 hinged near their rear ends on cross shafts 49. For each vertical row of compartments the floors are provided with a tilting bar 50 to which the rear ends of the floors are pivoted, the bars being located between the intermediate and rear walls 43 and 44 of the receiver, and each bar being connected at its lower end to one end of a bell crank lever 51 from whose other end a rod 52 extends terminating in front of the receiver in a knob 53. A spring 54 is connected with each lever and tends to swing the lever to hold the respective bar 50 down and with the connected compartment floors in their upper closed position. When a rod 52 is pulled, the corresponding bar 50 will be raised and the floors connected therewith will be tilted downwardly so that any received coins will drop down into the receptacle 45. Thus, when a passenger enters the vehicle and deposits his fare the fare is immediately projected to the corresponding compartment of the receiver where it can be readily checked by the operator and then dumped into the receptacle 45.

I provide means at the receiver R for indicating to the operator which seats in the vehicle are occupied so as to guide him in the opening of doors for new passengers. For each compartment, a lamp 55 is provided which may be located behind the intermediate wall 43 adjacent to an opening 56 in the wall so that the lamp will be visible to the operator through the glass front 42. As shown in Figure 7, each seat 13 is provided with a lower contact 57 and an upper contact 58 so arranged that when the passenger sits down, the contacts will be brought into engagement. A conductor 59 connects the lower contact in each seat with a current supply lead 60 from a battery B' whose other terminal is grounded to the vehicle framework. This battery may be the same battery that supplies current for operation at the valves 32. A conductor 61 connects the upper contact in each seat with one terminal of the lamp 55 in the receiver compartment corresponding to that seat, the other terminals of the lamps being connected by a conductor 62 with the vehicle framework. With this arrangement, when a passenger sits down he will close a circuit to the corresponding compartment lamp and the lamp will remain illuminated so long as the passenger remains seated. When the passenger leaves the seat the lamp goes out and thus the operator will know what seats are vacant. The lamps also serve to illuminate the compartments so that the operator may more readily inspect the fares.

Briefly summing up the operation, when a passenger is to be received, the operator, by consulting the lamps on the receiver, will know what seats are vacant and what doors to open. The passenger walks to a vacant seat and drops his fare into the fare slot for that seat and the deposited coin or token will close the circuit for the corresponding impact mechanism whose plunger 33 will be thrown upwardly and the coin impacted and projected rapidly through the corresponding chute to the corresponding compartment in the receiver where the fare can be checked by the operator and then dumped into the receptacle 45. As soon as the passenger sits down the corresponding lamp will also illuminate.

It may happen that one passenger will pay for a number of passengers and will deposit all the coins or tokens into one depository slot. In this case the deposited coins or tokens are all projected to the same receiver compartment but the operator knows the number of persons who entered and can therefore check up on the total fares and then as the passengers seat themselves the lamps will indicate the seats they have occupied.

The width of the depository insert slot is preferably such that coins or tokens may be inserted only one at a time, and the operation of the impact mechanism is so rapid that substantially the instant a token or coin reaches the contact bars the impact mechanism operates to project the coin or token to the receiver. Should two thin coins or tokens pass through the insert slot at the same time, they will be simultaneously projected by the impact mechanism to the receiver.

In my improved system in which coins are projected by impact to the receiver, the force of gravity is a negligible element and the entire course of the coin from a depository to the receiver could be against the force of gravity. The momentum imparted to the coins or tokens by the impact is so great that they will be projected with great speed to the receiver through a comparatively long distance. Any corners or bends in the coin chutes will be designed so that the least resistance will be interposed to the coin travel.

It is evident that the fare collecting system could be used on street cars, railway cars and other vehicles, and could also be adapted for service for collecting admittances for theatres, parks, and like places.

It is also evident that instead of the pneumatically operated means shown, mechanical means and solenoid or other electrical means could be utilized for imparting momentum to deposited coins or tokens.

Other changes and modifications may be made and I do not therefore desire to be limited to the exact structure, arrangement and operation shown except as will be necessitated by the prior art.

I claim as follows:

1. In a fare collection system for a passenger vehicle, the combination of a depository for coins at the entrance into the vehicle, a coin receiver at the driver's station, means affording a guide path for the passage of coins from said depository to said receiver, and means automatically controlled upon deposit of a coin in said depository for subjecting the coin to impact to impart momentum thereto for rapidly projecting the coin through said path to said receiver.

2. In a fare collection system for a passenger vehicle, the combination of a depository for coins at a point remote from the driver's station, a coin receiver at the driver's station, means affording a guide path for the passage of coins from said depository to said receiver, means at said depository for impinging a deposited coin to impart momentum thereto for projecting the coin through said guide path to said receiver, electrical means controlling the operation of said impinging means, a circuit for said electrical means, and means whereby a deposited coin will automatically condition said circuit for operation of said electrical means.

3. In a fare collection system for an automotive passenger vehicle, the combination of a depository for coins at each of the vehicle seats, a coin receiver at the driver's station, means affording a guide path for the passage of coins from each depository to said receiver, impinging means at each depository for impinging a deposited coin to impart momentum thereto for projecting the coin through said path to the receiver, and electrical means automatically controlled by the deposit of a coin for effecting operation of the respective impinging means.

4. In a fare collection system for a passenger vehicle, the combination of a coin receiver at the driver's station subdivided into a plurality of compartments, a plurality of coin depositories located throughout the vehicle body remote from said receiver, each depository being connected with one of said receiver compartments by a guide way, means at each depository automatically controlled by a deposited coin for engaging the coin to cause projection thereof from said depository through said guideway to the corresponding receiver compartment.

5. In a fare collection system for a passenger vehicle, the combination of a coin receiver at the driver's station subdivided into a plurality of compartments, a plurality of coin depositories located throughout the vehicle body remote from said receiver, each depository being connected with one of said receiver compartments by a guideway, means at each depository automatically controlled by a deposited coin for engaging the coin to cause projection thereof from said depository through said guideway to the corresponding receiver compartment, a collection receptacle for said receiver, and means controlling the discharge of coins from said compartment to said receptacle.

6. In a fare collection system, the combination of a depository for coins, a coin receiver, means affording a guide path for the passage of coins from the depository to said receiver, pneumatically operated impinging means comprising a cylinder at said depository and a piston operable in said cylinder and having a piston rod for impinging a deposited coin to impart momentum thereto for projecting the coin through said path to the receiver, means controlling the flow of air under pressure to said cylinder, and electrical means automatically controlled by the deposit of a coin for effecting operation of said air flow controlling means.

7. In a fare collection system for an automotive passenger vehicle, the combination of depositories for coins at the passenger seats in the vehicle, a coin receiver at the driver's station, a tube extending from each depository to said receiver affording a guide path for deposited coins, circuit terminals in each depository forming a support for deposited coins, a cylinder in each depository, a piston in each cylinder having a striking extension for striking a deposited coin, air flow controlling means for controlling the flow of air into said cylinders, electrical means controlling the operation of said air flow controlling means, and a circuit for said electrical means including said circuit terminals and closed by deposited coins for operation of said electrical means for air flow to said cylinders and striking of said coins by said piston extensions for projection of said coins through the respective tubes to said coin receiver.

8. In a fare collection system for a passenger vehicle, the combination of a coin receiver at the driver's station, depositories for coins at the seats within the vehicle body, a tube extending upwardly from each depository and then laterally to the coin receiver for conducting a deposited coin to the receiver, circuit terminals at the lower end of each tube for supporting a deposited coin, pneumatically operated impinging means below each tube for striking a deposited coin to propel it through the tube to the coin receiver, electrically operated means controlling the flow of air to said pneumatic means, an electrical circuit for said electrically controlled means connecting with said circuit terminals and closed by a coin received by said terminals whereby said electrical controlling means admits air to said pneumatic means and the coin is struck for delivery to the coin receiver.

9. In a fare collection system for a passenger vehicle, the combination of a coin receiver at the driver's station, stanchions at the seats and a coin depository on each stanchion, a tube extending upwardly through each stanchion and deflecting laterally to connect with the coin receiver, coin impinging means within each stanchion below the end of the tube therein, and means automatically controlled by a deposited coin for causing operation of the impinging means and propulsion of the deposited coin through the tube and to the coin receiver.

ERNEST H. THOMPSON.